UNITED STATES PATENT OFFICE 2,575,285

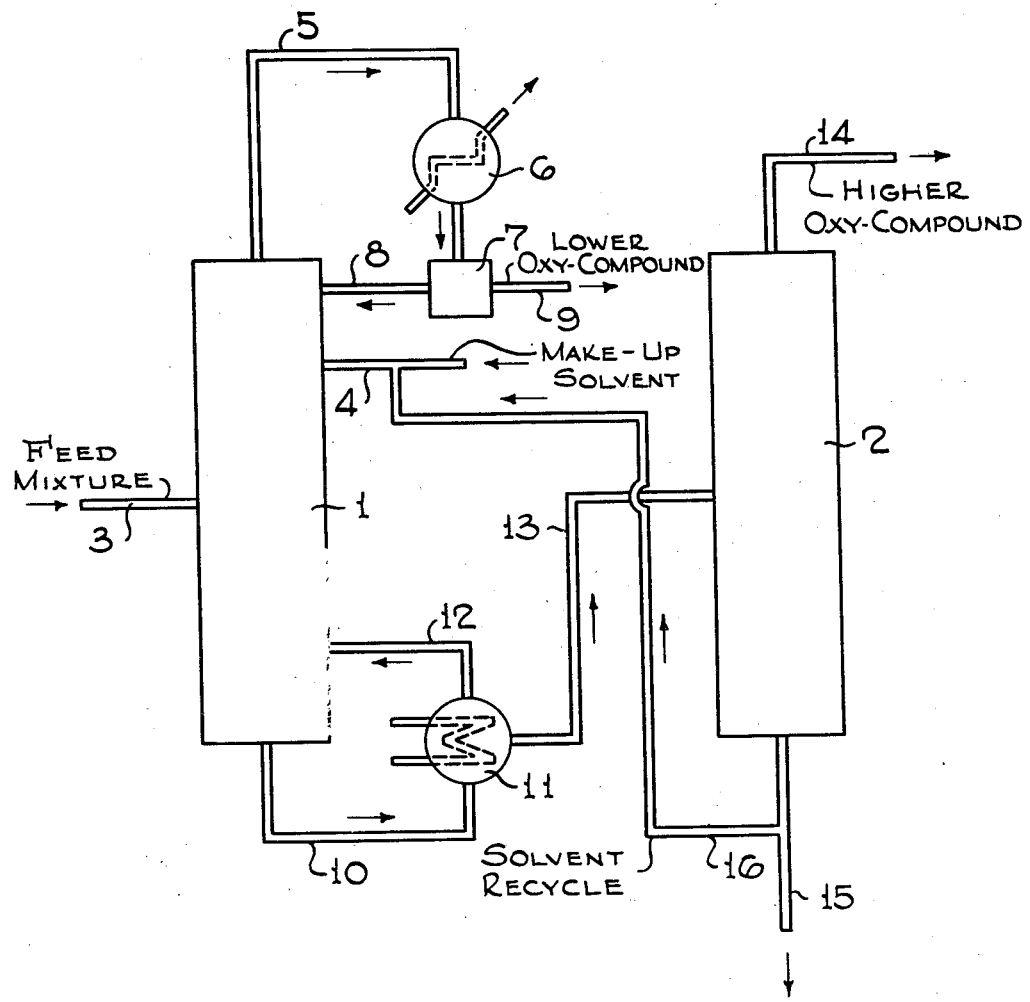

EXTRACTIVE DISTILLATION OF ALCOHOL-CONTAINING MIXTURES WITH DIPHENYL ETHER AS SOLVENT

Carl S. Carlson, Roselle, and Paul V. Smith, Jr., Westfield, N. J., assignors to Standard Oil Development Company, a corporation of Delaware Application January 7, 1949, Serial No. 69,636

14 Claims. (Cl. 202—39.5)

This invention relates to a practical method of separating oxygenated organic compounds and is concerned with the controlled use of diphenyl ether per se or in a liquid mixture, e. g. with biphenyl, as a refluxing medium in a continuous fractional distillation of the oxygenated compounds.

The process of this invention is best applied to distillation cuts or mixtures, the components of which distill within a narrow range; however, it may be applied to wide-boiling mixtures as well. The invention is particularly directed to the separation of $C_3$ to $C_6$ alcohols of different types and molecular weights from one another and to the separation of alcohols as a class or one particular alcohol from other $C_3$—$C_6$ oxygenated compounds such as ketones, acetals, esters, aldehydes, etc., and is useful only in separating between compounds boiling in the range of normal propyl alcohol, secondary butyl alcohol and higher boiling compounds, i. e. with normal boiling points of 97.8° C. to 150° C. Lower boiling mixtures cannot be separated. For example, a mixture of ethanol and isopropanol cannot be separated economically by the present invention. Typical separations which can be made are n-propyl alcohol from n-butyl alcohol, n-propyl alcohol from i-butyl alcohol, n-propyl alcohol from methyl butyl ketone, n-propyl alcohol from valeraldehyde, n-propyl alcohol from a mixture of $C_4$ and higher molecular weight alcohols, n-propyl alcohol from a mixture of $C_5$ and higher molecular weight carbonyl compounds, and n-butyl alcohol from isomeric $C_5$ and higher alcohols.

The crude oxygenated mixture may contain amounts of water greater than, less than, or equal to the amounts corresponding to azeotropic compositions, but in any case it must be miscible with the solvent in all portions of the fractionation zone.

Some of the above-described mixtures are obtained by an olefin hydration reaction, e. g., when a mixture of propylene and butylenes are absorbed in sulfuric acid, diluted, hydrolyzed, and a resulting aqueous alcohol mixture is stripped out. Another important source of such a mixture is the Fischer synthesis hydrogenation of carbon monoxide, especially when the aqueous layer product formed contains not only lower primary and secondary alcohols but also various ketones, aldehydes, ethers, acetals, esters, carboxylic acids and certain tertiary alcohols. Still another source is in the products of hydrocarbon oxidation where both oil and water layers are obtained, each containing oxygenated organic compounds. Narrow-boiling range mixtures which may be obtained by the ordinary distillation processes from aqueous solution are as follows:

TABLE I

| Group | Components | Normal B. Pt., °C. |
|---|---|---|
| I | n-Propyl Alcohol | 97.8 |
| | s-Butyl Alcohol | 99.5 |
| II | n-Propyl Alcohol | 97.8 |
| | s-Butyl Alcohol | 99.5 |
| | i-Butyl Alcohol | 107.3 |
| III | n-Propyl Alcohol | 97.8 |
| | s-Butyl Alcohol | 99.5 |
| | Methyl Butyl Ketone | 127.2 |
| IV | n-Butyl Alcohol | 117.7 |
| | sec-Amyl Alcohol | 119.2 |

The narrow-boiling range mixture may be a binary or tertiary mixture as in the groups shown, but generally the crude mixtures contain additional oxygenated organic compounds, which do not interfere with the basic operation of this invention in isolating the principal alcohol components of the mixtures.

A typical propanol cut obtained from the water layer of a Fischer synthesis process contains the following:

TABLE II

| Component | Normal Boiling Pt. | Binary Water Azeotrope B. Pt. |
|---|---|---|
| | °C. | °C. |
| Ethanol | 78.5 | 78.1 |
| Isopropanol | 82.4 | 80.4 |
| n-Propanol | 97.8 | 87.7 |
| sec-Butanol | 99.5 | 87.5 |
| iso-Butanol | 107.3 | 89.9 |
| n-Butanol | 117.7 | 92.2 |
| tert-Butanol | 82.8 | 79.9 |
| iso-Propyl Acetate | 89.4 | [1] 75.5 |
| n-Propyl Acetate | 101.6 | 82.4 |
| Methyl Ethyl Ketone | 79.6 | 74.8 |
| Methyl n-Propyl Ketone | 102.3 | 82.9 |
| Methyl iso-Propyl Ketone | 94.3 | |
| Diethyl Ketone | 102.0 | |
| Methyl iso-Butyl Ketone | 116.8 | |
| Ethyl Propionate | 99.1 | 81.2 |
| iso-Valeraldehyde | 92.5 | 82 |
| n-Valeraldehyde | 103.7 | 80.6 |
| Methyl n-Butyl Ketone | 127.2 | |

[1] Ternary with ethyl alcohol.

In the above cut, the kinds and relative quantities of the components vary greatly but the major components are n-propanol, secondary butanol and methyl normal butyl ketone. When this cut is distilled from aqueous solution, many of the compounds form azeotropes with water and with themselves with the result that the boiling points are brought so close together that separation is very difficult to achieve. The difficulties encountered can be appreciated by reference to Table II which shows the overlapping of the anhydrous and binary aqueous azeotrope boiling points.

To obtain the desired separation of purified organic components from mixtures like that mentioned with benefits of the present invention, the mixture is subjected to a continuous fractional distillation in a column of practical size, including a primary rectification zone, a secondary rectification zone above the primary zone, and a stripping zone below the primary zone for countercurrent vapor liquid contact under reboiling and refluxing conditions. A sufficiently large quantity of solvent is introduced at the upper part of the primary rectification zone to effectively modify the relative volatilities of the organic compounds to be separated and to distill a larger part of one component or group of components than of another component or another group of components from the internal reflux.

The separation can be effected in a continuous manner under steady state conditions to obtain product streams of desired purities and constant compositions while supplying the large quantity of solvent to the upper part of the rectification zone. The temperature of the solvent introduced into the primary rectification zone is preferably close to the temperature of the liquid on its feed plate, although it may be lowered to partially condense vapors ascending to the solvent feed plate.

Since the efficient operation is essentially continuous, the solvent is added continuously near the top of the primary rectification zone of the column while the mixture of oxygenated organic compounds to be separated is fed continuously into the column at a lower point while sufficient heat is provided to afford distillation throughout the column.

The feed stream of the oxygenated organic compounds is preferably introduced into the fractionating column between the primary rectification zone and the lower stripping zone at a point where the ratio of the main organic compounds to be separated in the feed is similar to the ratio of these compounds in the internal reflux descending through the column.

The feed stream is preferably preheated to a temperature close to that of the internal liquid reflux under practically equilibrium boiling conditions at the point of introduction. The preheated feed stream may be liquid, partially vaporized, or completely vaporized when introduced into the fractionating column.

Vapors of the organic compounds introduced as a feed stream at the bottom part of the primary rectification zone in the fractionating column pass up through the primary rectification zone in contact with descending internal liquid reflux under practically equilibrium reboiling and refluxing conditions. The secondary rectification zone serves to strip solvent from the overhead vapors.

The quantity of solvent required to be introduced continuously at the upper part of the primary rectification zone for accomplishing the desired separation of the close-boiling compounds is considerably greater than the quantity of condensate with which it becomes homogeneously mixed. Therefore, it is necessary to make the solvent concentration of the internal reflux substantially above a critical minimum of the order of 75 volume percent when a $C_3$ alcohol is to be distilled overhead. With adequate solvent concentration in the internal reflux for effecting the separation, the organic component to be isolated in the bottoms is dissolved in the internal reflux that reaches the bottom part of the stripping zone.

The minimum concentration in the internal reflux of the solvent for obtaining the separation depends on the particular organic compounds to be separated. For separating between $C_4$, $C_5$ and $C_6$ alcohols, a somewhat lower minimum below 75 volume percent of the solvent containing diphenyl ether may be used, but in any event the solvent in a major proportion of the internal reflux is required. In the limiting case of separating n-propyl alcohol from sec-butyl alcohol, essentially no separation is effected if the internal reflux contains much less than 75 volume percent solvent, and for obtaining satisfactory results on a practical scale, more than 80 volume per cent solvent, preferably 80-99 volume percent, is required in the internal liquid reflux. As the dilution of the internal reflux becomes infinite, the selectivity of separation is increased but the operating efficiency is excessively lowered on account of the relatively small quantities of the oxygenated organic compounds being processed.

Under steady state conditions existing in a continuously operating fractional distillation zone, the internal reflux having adequate concentration for accomplishing the separation of the close-boiling alcohols and other oxygenated compounds, there tends to be a nearly constant solvent concentration in the homogeneous liquid phase on each plate above the feed point and on each plate below the feed point although the average concentration on the plates above and below the feed point may differ. This internal reflux in flowing from the top to the bottom becomes richer in the oxygen compounds having the lowest relative volatility in the presence of the solvent, while the oxygen compounds having the highest relative volatility in the solvent are distilled overhead.

The overhead vapors from the secondary rectification zone are enriched in one or more of the organic components rendered relatively more volatile by concentration of the solvent in the liquid reflux while the remaining portion of the organic material introduced with the feed remains dissolved in the internal reflux. For example, in distilling an aqueous mixture of two alcohols the distillation may be carried out so that either one of the alcohols is obtained free of the other. In separating n-propanol from secondary butanol, the distillation may be conducted so that n-propanol is obtained overhead and a mixture of n-propanol and sec-butanol is obtained in the bottoms or a portion of the secondary butanol may be taken overhead with the n-propanol so that secondary butanol free of n-propanol is obtained in the bottoms.

The functioning of the stripping zone may be described as follows:

The mixture of the close-boiling alcohols and other oxygenated compounds to be separated, as in the liquid reflux from the bottom of the rectification zone, flows downwardly through the stripping zone in countercurrent contact with ascending vapors evolved from the solution under reboiling conditions. A sufficiently high concentration of solvent is maintained in the liquid flowing down through the stripping zone, as in the rectification zone, to make the liquid progressively richer in oxygenated compounds having the lowest relative volatility in the solvent while the oxygenated compounds having the highest relative volatility in the solvent are stripped from the liquid. Under practically equilibrium reboiling and refluxing conditions for complete stripping in the stripping zone, the organic compounds rendered more volatile may be removed as vapor overhead from the stripping zone at the same rate that they enter the stripping zone as part of the liquid feed to this zone and a solution of the organic compounds rendered less volatile, freed of the more volatile compounds in the liquid, may be withdrawn from a bottom part of the stripping zone.

In the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

This invention will be described in detail as applied to the separation of n-propyl alcohol and sec-butyl alcohol from aqueous solution.

Referring to the drawing, a feed fraction is introduced by line 3 into the tower 1 where it is fractionated in the presence of a relatively non-volatile liquid solvent stream containing diphenyl ether per se or mixed with a similarly high boiling liquid organic solvent introduced through line 4, at a point several plates below the top of the tower. The conditions in the tower are such as to cause a distillation of the alcohol compounds in the presence of the diphenyl ether on each plate of the tower. A sufficient amount of the diphenyl ether solvent is added so that it is present in major proportion and preferably to the extent of 80–90 volume percent, on each plate. As the vapors of the feed pass up the column some of them are dissolved in the large excess of diphenyl ether descending the column and are collected together with the diphenyl ether in pools on each plate. Conditions are maintained on each plate of the tower such that the liquid mixtures of the n-propyl and sec-butyl alcohols are at their boiling points and are continuously being contacted with vapors boiled from the plates below. Because of the enhanced volatility of the n-propyl alcohol in relation to the sec-butyl alcohol the vapors are relatively rich in the former and poor in the latter. By maintaining the amount of the solvent on each plate so large that infinite dilution is approached, the optimum relative volatilities for the separation of the desired components can be secured. Furthermore, by controlling the amount of oxygenated compound reflux and consequently the reflux ratio and the number of plates, the actual degree of separation may be varied until the desired product purity and recovery are obtained. Thus, suitable temperature and reflux conditions are maintained in the tower so that substantially pure n-propyl alcohol appears in the overhead stream and a solution of sec-butyl alcohol in the diphenyl ether solvent appears in the bottom product. The plates above the point of diphenyl ether solvent entry serve to strip the diphenyl ether solvent from the alcohol overhead. Any water present in the feed will appear with the overhead alcohol product.

Overhead vapors consisting substantially of pure n-propanol and all the water entering with the feed are withdrawn from the top of column 1 through line 5 by which they are passed through condenser 6 to a receiver 7. A portion of the condensate collected in receiver 7 is returned to the top part of the column 1 as external reflux through line 8. The remaining portion of distillate collected in receiver 7 is withdrawn through line 9 as a product.

Bottoms liquid consisting of a solution of sec-butyl alcohol in the diphenyl ether solvent collected at the lower part of column 1 is passed by line 10 into reboiler 11 for heating by indirect or direct heat exchange with a heating medium such as live steam. A portion of the bottoms liquid heated and partially vaporized in the reboiler 11 is recycled by line 12 to the lower part of column 1. The remaining portion is withdrawn through line 13 to tower 2 where sec-butyl alcohol is separated from the diphenyl ether solvent and removed overhead through line 14. The solvent, which remains non-volatile, is removed from the bottom of the tower through line 15 and recycled to tower 1 through line 16.

Representative data are given in the following table showing the application of this invention to the separation of normal propanol and secondary butanol. The relative volatility given in the table is the volatility of one component divided by that of the other, the volatility of each component being proportional to its partial pressure divided by its mol fraction in the liquid phase. It is also defined by the equation $$\text{Alpha} = (y_1/y_2)/(x_1/x_2)$$

where $y$ refers to the vapor phase mol fractions of the components to be separated and $x$ refers to the liquid phase mol fractions of the components to be separated, subscript one designates the more volatile component and subscript two the less volatile component.

TABLE IV

*Relative volatility of normal propanol to secondary butanol*

| Run No. | 1 | 2 | 3 | 4 | 5 |
| --- | --- | --- | --- | --- | --- |
| Charge: | | | | | |
| Mol Per Cent n-PrOH (Binary Basis) | 70 | 80 | 75.9 | 77.5 | 75.8 |
| Mol Per Cent sec-BuOH (Binary Basis) | 30 | 20 | 24.1 | 22.5 | 24.2 |
| Vol. Per Cent Diphenylether-Biphenyl Solvent [1] | 90 | 90 | | | |
| Vol. Per Cent Diphenyl Ether | | | 90 | 80 | 70 |
| Vapor Sample: | | | | | |
| Mol Per Cent n-PrOH | 78.9 | 87.1 | 83.2 | 85.2 | 73.4 |
| Mol Per Cent sec-BuOH | 21.1 | 12.9 | 16.8 | 14.8 | 26.6 |
| Liquid Sample: | | | | | |
| Mol Per Cent n-PrOH | 62.6 | 73.9 | 60.8 | 67.7 | 76.9 |
| Mol Per Cent sec-BuOH | 37.4 | 26.1 | 39.2 | 32.3 | 23.1 |
| Relative Volatility of n-PrOH over sec-BuOH | 2.23 | 2.39 | 3.19 | 2.75 | 0.83 |
| Normal Volatility in Absence of Solvent: n-PrOH over sec-BuOH | 1.05 | | | | |

[1] Mixture of 73.5% diphenyl ether and 26.5% biphenyl.

From the above it is evident that very efficient separations can be obtained by the use of diphenyl ether as the refluxing medium as evidenced by the excellent relative volatilities obtained particularly at 80 volume percent solvent.

The nature and objects of the present invention having been thus fully set forth and specific examples of the same given, what is claimed as new and useful and desired to be secured by Letters Patent is:

1. The method of separating an alcohol having from 3 to 6 carbon atoms from $C_3$ to $C_6$ oxygenated organic compounds of the class consisting of alcohols and neutral carbonyl compounds which form close-boiling mixtures difficult to separate by ordinary fractional distillation, which comprises continuously introducing a feed mixture of said oxygenated compounds to a fractional distillation zone wherein vapors of said compounds ascend countercurrently to a homogeneous liquid reflux of the oxygenated compounds dissolved in a sufficiently high proportion of diphenyl ether solvent whereby the normal volatility relationship of the compounds are altered and those rendered more volatile are vaporized, continuously removing vapors of an alcohol component rendered more volatile in the presence of the refluxing liquid overhead from the fractional distillation zone, and removing as bottoms a residual solution of undistilled oxygenated organic components of the mixture including the neutral carbonyl compounds rendered less volatile in the presence of the diphenyl ether solvent.

2. The method of separating between $C_3$ to $C_6$ alcohol components of different molecular weight which form a close-boiling mixture difficult to separate by ordinary fractional distillation, which comprises continuously introducing a feed mixture of said alcohols to a fractional distillation zone wherein vapors of said alcohols ascend countercurrently to liquid reflux of the alcohols dissolved in a major volume proportion of diphenyl ether to effect vaporization of the alcohol component having a lower molecular weight, continuously removing vapor of the lower molecular weight alcohol component overhead from the fractional distillation zone, and removing a solution of the higher molecular weight alcohol component in the diphenyl ether as bottoms.

3. Process according to claim 2 in which n-propyl is the lower molecular weight alcohol removed overhead and secondary butyl alcohol is the higher molecular weight alcohol in the diphenyl ether bottoms.

4. In a process of separating aqueous azeotropic mixtures of $C_3$ to $C_6$ alcohols which form close-boiling mixtures difficult to separate by ordinary fractional distillation, the steps which comprise continuously passing vapors of said alcohols up through a primary rectification zone wherein the alcohol vapors ascend in contact with a countercurrent internal reflux comprising condensate from said vapors and a diphenyl ether solvent, continuously introducing said diphenyl ether into the condensate at an upper part of the primary rectification zone, continuously passing from said primary rectification zone into a secondary rectification zone the vapor of one of said alcohols volatilized to a greater extent than another of said alcohols having a higher molecular weight by maintaining the diphenyl ether solvent content of the internal reflux above 75 volume per cent, and continuously withdrawing from the top of the secondary rectification zone the alcohol rendered more volatile with water vapor, and continuously withdrawing from a bottom part of said primary rectification zone internal reflux which is a solution of said alcohols having a higher molecular weight in said diphenyl ether solvent.

5. A method of separating aqueous $C_3$ to $C_6$ alcohols which form close-boiling mixtures difficult to separate by ordinary fractional distillation, which comprises continuously introducing a feed mixture of said aqueous alcohols to a fractional distillation ne wherein vapors of said alcohols ascend co ..ercurrently to a liquid reflux of the alcohols dissolved in a higher proportion of a non-volatile solvent containing diphenyl ether to effect vaporization of the lower molecular weight alcohols, continuously removing vapors of the lower molecular weight alcohols and water overhead from the fractional distillation zone, and removing a solution of the higher molecular weight alcohols in the non-volatile solvent as bottoms.

6. Process according to claim 5 in which n-propyl alcohol is removed overhead and a solution of n-propyl alcohol and secondary butyl alcohol in diphenyl ether is removed as bottoms.

7. Process of separating aqueous azeotropic mixtures of $C_3$ to $C_6$ alcohols difficult to separate by ordinary fractional distillation, which comprises continuously introducing a feed mixture of the alcohols to a rectification zone wherein vapors of the feed mixture ascend countercurrently in contact with a liquid reflux comprising condensate from said vapors and a liquid solvent comprising diphenyl ether, increasing the solvent content of the condensate at an upper part of the rectification zone by introducing the solvent continuously thereto so that the solvent is a major part of the internal reflux throughout the rectification zone, introducing internal liquid reflux from a bottom part of the rectification zone to a stripping zone, passing said reflux in countercurrent contact with vapors boiled from the internal liquid reflux as it flows down to a bottom part of the stripping zone, withdrawing from the top part of the rectification zone water and the alcohol rendered the most volatile, withdrawing from the bottom part of the stripping zone an anhydrous solution of alcohols rendered less volatile dissolved in said liquid solvent.

8. In a process of separating aqueous azeotropic mixtures of n-propyl alcohol and sec-butyl alcohol, the steps which comprise continuously passing a solution of n-propyl alcohol in diphenyl ether containing sec-butyl alcohol down through a stripping zone so that a liquid portion of the solution flows countercurrently in contact with vapors evolved therefrom under constant refluxing and reboiling conditions, maintaining a concentration of at least 75 volume per cent solvent in the resulting internal reflux to effect vaporization of a larger part of the n-propyl alcohol than of the sec-butyl alcohol in said reflux, continuously withdrawing vapors of alcohols and water overhead from the stripping zone, the n-propyl alcohol being thus withdrawn as vapor at essentially the same rate that the n-propyl alcohol dissolved in said solvent enters the stripping zone, and withdrawing from a bottom part of the stripping zone a solution of sec-butyl alcohol in diphenyl ether substantially free of n-propyl alcohol and water.

9. In a process of separating aqueous $C_3$ to $C_6$ alcohols which form close-boiling mixtures difficult to separate by ordinary fractional distillation, the steps which comprise continuously passing into an upper part of a stripping zone a solution of the alcohols in diphenyl ether so that a liquid portion of said solution flows downwardly through the stripping zone in countercurrent contact with vapors evolved from the solution under constant refluxing and reboiling conditions, maintaining a sufficiently high concentration of solvent in the resulting internal reflux to effect vaporization of a larger part of one of said alcohols than of another of said alcohols having a higher molecular weight, the alcohol thus rendered more volatile being withdrawn overhead as vapor with water vapor at essentially the same rate that this alcohol and water dissolved in the solvent enters the stripping zone and withdrawing from a bottom part of the stripping zone residual internal reflux which is an anhydrous solution of higher molecular weight alcohol in diphenyl ether substantially free of the alcohol rendered more volatile.

10. In a process of separating normal propyl alcohol from its aqueous mixtures with higher boiling alcohols, the steps which comprise continuously passing vapors of a mixture of normal propyl alcohol and higher alcohols up through a primary rectification zone wherein the alcohol vapors ascend in contact with a countercurrent internal reflux comprising condensate from said vapors dissolved in a liquid solution of diphenyl ether, continuously introducing said diphenyl ether into the condensate at an upper part of the primary rectification zone, continuously passing from said primary rectification zone into a secondary rectification zone the vapor of the normal propyl alcohol wherein said vapor is further rectified to condense an accompanying small amount of solvent vapors, continuously returning solvent condensed in said secondary rectification zone to said primary rectification zone and continuously withdrawing from the top of the secondary rectification zone water vapor and normal propyl alcohol, said water vapor and alcohol being free of solvent, and continuously withdrawing from a bottom part of said primary rectification zone internal reflux which is a solution of said higher boiling alcohols in said diphenyl ether.

11. Process as in claim 10 in which the liquid solution of diphenyl ether is present in the reflux to the extent of 80–99 volume percent.

12. In a process of separating normal propyl alcohol from its aqueous mixtures with alcohols having four carbon atoms, the steps which comprise continuously passing vapors of a mixture of normal propyl alcohol with alcohols of four carbon atoms up through a primary rectification zone wherein the alcohol vapors ascend in contact with a countercurrent internal reflux comprising condensate from said vapors and a major volume proportion of diphenyl ether, continuously introducing said diphenyl ether into the condensate at an upper part of the primary rectification zone, continuously passing from said primary rectification zone into a secondary rectification zone the vapor of the normal propyl alcohol wherein said vapor is further rectified to condense accompanying small amount of solvent vapors, continuously returning solvent condensed in said secondary rectification zone to said primary rectification zone and continuously withdrawing from the top of the secondary rectification zone water vapor and normal propyl alcohol, said water vapor and alcohol being free of solvent, and continuously withdrawing from a bottom part of said primary rectification zone internal reflux which is a solution of said four carbon atoms alcohols in said diphenyl ether.

13. Process as in claim 12 in which the diphenyl ether is present in the reflux to the extent of 80–99 volume percent.

14. In a process of separating normal propyl alcohol from its aqueous mixture with secondary butyl alcohol, the steps which comprise continuously passing vapors of a mixture of normal propyl alcohol with secondary butyl alcohol up through a primary rectification zone wherein the alcohol vapors ascend in contact with a countercurrent internal reflux comprising condensate from said vapors and a liquid solution of diphenyl ether in biphenyl, continuously introducing said diphenyl ether solution into the condensate at an upper part of the primary rectification zone, continuously passing from said primary rectification zone into a secondary rectification zone the vapor of the normal propyl alcohol wherein said vapor is further rectified to condense accompanying solvent vapors, continuously returning solvent vapors condensed in said secondary rectification zone to said primary rectification zone and continuously withdrawing from the top of the secondary rectification zone water vapor and normal propyl alcohol, said water vapor and alcohol being free of solvent, and continuously withdrawing from a bottom part of said primary rectification zone internal reflux which is a solution of said secondary butyl alcohol in above 75 volume percent of said diphenyl ether solution.

CARL S. CARLSON.
PAUL V. SMITH, Jr.

REFERENCES CITED

The following references are of record in the file of this patent:

UNITED STATES PATENTS

| Number | Name | Date |
|---|---|---|
| 2,107,265 | Archibald | Feb. 8, 1938 |
| 2,305,038 | Schumacher | Dec. 15, 1942 |
| 2,339,160 | Dunn et al. | Jan. 11, 1944 |